US008433487B2

(12) United States Patent
Ostberg et al.

(10) Patent No.: US 8,433,487 B2
(45) Date of Patent: Apr. 30, 2013

(54) SHIFT SEQUENCING SYSTEMS FOR A DUAL CLUTCH TRANSMISSION

(75) Inventors: Claes Magnus Ostberg, Lilla Edet (SE); Xuefeng Tim Tao, Northville, MI (US)

(73) Assignee: GM Global Technology Operations LLC

( * ) Notice: Subject to any disclaimer, the term of this patent is extended or adjusted under 35 U.S.C. 154(b) by 361 days.

(21) Appl. No.: 12/767,115

(22) Filed: Apr. 26, 2010

(65) Prior Publication Data

US 2011/0263383 A1   Oct. 27, 2011

(51) Int. Cl.
  *G06F 7/00* (2006.01)
(52) U.S. Cl.
  USPC .......................................................... 701/64
(58) Field of Classification Search .................. None
See application file for complete search history.

(56) References Cited

U.S. PATENT DOCUMENTS

| 6,368,249 B1 | 4/2002 | Hubbard |
| 7,155,993 B2 | 1/2007 | Koenig et al. |
| 2009/0249907 A1 | 10/2009 | Singh et al. |

FOREIGN PATENT DOCUMENTS

| EP | 0740090 A2 | 10/1996 |
| GB | 2326918 A | 1/1999 |
| GB | 0907686.0 | 5/2009 |

OTHER PUBLICATIONS

Great Britain Search Report dated Aug. 20, 2009 for Application No. GB0907686.0, 3 pages.

*Primary Examiner* — Thomas Tarcza
*Assistant Examiner* — Adam Alharbi

(57) ABSTRACT

A dual-clutch transmission (DCT) shift sequencing system includes a shift type module that determines a shift type based on a scheduled gear and a current attained gear of a DCT. A shift sequence module determines a sequence index based on the shift type. A sequencing module generates a fork command signal and a clutch command signal based on a first sequencing table corresponding to the sequence index. A shift abort module may be included to terminate an ongoing shift and to transition to an updated shift. A fork control module controls fork shifting in the DCT based on the fork command signal. A clutch control module controls clutch engagement in the DCT based on the clutch command signal.

20 Claims, 14 Drawing Sheets

| From Gear \ To Gear | R | N | 1 | 2 | 3 | 4 | 5 | 6 | 7 |
|---|---|---|---|---|---|---|---|---|---|
| R | | ToN | TrqInt | Direct | N/A | N/A | N/A | N/A | N/A |
| N | FromN | N/A | FromN | FromN | FromN | FromN | FromN | FromN | FromN |
| 1 | TrqInt | ToN | N/A | Direct | TrqIntOS | Direct | TrqIntOS | Direct | N/A |
| 2 | Direct | ToN | Direct | N/A | Direct | TrqIntOS | Direct | TrqIntOS | Direct |
| 3 | N/A | ToN | S2 | Direct | N/A | Direct | TrqIntOS | Direct | TrqIntOS |
| 4 | N/A | ToN | Direct | S3 | Direct | N/A | Direct | TrqIntOS | Direct |
| 5 | N/A | ToN | S2 | S3 | S4 | Direct | N/A | Direct | TrqIntOS |
| 6 | N/A | ToN | Direct | S3 | S4 | S5 | Direct | N/A | Direct |
| 7 | N/A | ToN | N/A | Direct | S4 | Direct | S4 | Direct | N/A |

| | Attained Shaft Gear | PreSel Shaft Gear | Attained Clutch | PreSel Clutch |
|---|---|---|---|---|
| 0 | Begin | Begin | Begin | Begin |
| 1 | Curr | Curr | InGear | Neutral |
| 2 | Curr | New | InGear | Neutral |
| 3 | Curr | New | InGear | Neutral |
| 4 | Curr | New | Diseng | Prepare |
| 5 | Curr | New | Diseng | Torque |
| 6 | Curr | New | Neutral | Speed |
| 7 | Pred | New | Neutral | InGear |
| 8 | Neutral | New | Neutral | InGear |
| 9 | | | | |

424: Abort To Sequence / Current Row in sequence

| | 0 | 1 | 2 | 3 | 4 | 5 | ... | 12 | 13 |
|---|---|---|---|---|---|---|---|---|---|
| 1 | 0 | 1 | 0 | 0 | 0 | 0 | ... | 0 | 0 |
| 2 | 0 | 1 | 0 | 0 | 0 | 0 | ... | 0 | 0 |
| 3 | 0 | 1 | 0 | 0 | 0 | 0 | ... | 0 | 0 |
| 4 | 0 | 2 | 0 | 0 | 0 | 1 | ... | 0 | 0 |
| 5 | 0 | 2 | 0 | 0 | 0 | 2 | ... | 0 | 0 |
| 6 | 0 | 2 | 0 | 0 | 0 | 3 | ... | 0 | 0 |
| ... | ... | ... | ... | ... | ... | ... | ... | ... | ... |
| 13 | 0 | 0 | 0 | 0 | 0 | 0 | ... | 0 | 0 |
| 14 | 0 | 0 | 0 | 0 | 0 | 0 | ... | 0 | 0 |

| | Attained Shaft Gear | PreSel Shaft Gear | Attained Clutch | PreSel Clutch |
|---|---|---|---|---|
| 0 | Begin | Begin | Begin | Begin |
| 1 | Curr | Curr | InGear | Neutral |
| 2 | Curr | Curr | InGear | Neutral |
| 3 | Curr | New | InGear | Neutral |
| 4 | Curr | New | InGear | Prepare |
| 5 | Curr | New | Diseng | Torque |
| 6 | Curr | New | Diseng | Speed |
| 7 | Curr | New | Neutral | InGear |
| 8 | Pred | New | Neutral | InGear |
| 9 | Neutral | | | InGear |

426: Abort To Sequence / Current Row in sequence

| | 0 | 1 | 2 | 3 | 4 | 5 | ... | 12 | 13 |
|---|---|---|---|---|---|---|---|---|---|
| 1 | 0 | 0 | 0 | 0 | 0 | 0 | ... | 0 | 0 |
| 2 | 0 | 0 | 0 | 0 | 0 | 0 | ... | 0 | 0 |
| 3 | 0 | 0 | 0 | 0 | 0 | 0 | ... | 0 | 0 |
| 4 | 0 | 0 | 0 | 0 | 0 | 0 | ... | 0 | 0 |
| 5 | 0 | 0 | 0 | 0 | 0 | 0 | ... | 0 | 0 |
| 6 | 0 | 0 | 0 | 0 | 0 | 0 | ... | 0 | 0 |
| ... | ... | ... | ... | ... | ... | ... | ... | ... | ... |
| 13 | 0 | 0 | 0 | 0 | 0 | 0 | ... | 0 | 0 |
| 14 | 0 | 0 | 0 | 0 | 0 | 0 | ... | 0 | 0 | ns
SHIFT SEQUENCING SYSTEMS FOR A DUAL CLUTCH TRANSMISSION

FIELD

The present disclosure relates to dual clutch transmission control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission drivetrain includes an internal combustion engine (ICE), a clutch and a manual transmission. The clutch engages with a flywheel on the ICE and transfers torque output of the engine to the manual transmission. Torque transfer from the ICE to the transmission is interrupted when a vehicle operator manually shifts between gears of the transmission. During a gear shift event, the clutch is disengaged (i.e. the ICE is disengaged from the transmission), a desired gear is manually selected, and the clutch is reengaged. Disengagement of the ICE from the transmission can negatively affect fuel economy and vehicle acceleration.

An automatic transmission drivetrain may include an internal combustion engine (ICE), a torque converter and an automatic transmission with planetary gear sets. The ICE provides output torque to the torque converter. The torque converter transfers torque from the ICE to the automatic transmission based on engine speed. The planetary gear sets include sun, carrier and ring gears that each has input, output and stationary operating states. Different gear ratios are selected by adjusting the operating state of each of the planetary gears in the planetary gear sets. An automatic transmission drivetrain provides uninterrupted torque transfer from the ICE to an output shaft of the automatic transmission. Typically, complex logic based approaches are used to control operating states of the planetary gears.

A dual-clutch transmission (DCT) drivetrain includes an ICE and a DCT (or semi-automatic transmission). The DCT includes two clutches, inner and outer transmission shafts, and two gear sets with respective gear shafts and/or lay shafts. As an example, the inner transmission shaft may be associated with a first gear set and controlled using a first clutch. The outer transmission shaft may be associated with a second gear set and controlled using a second clutch. The first gear set may include first, third and fifth gears. The second gear set may include second, fourth and sixth gears. By using two transmission shafts, a DCT drivetrain can provide uninterrupted torque transfer between the ICE and an output shaft of the DCT during gear shifts. This decreases shift times and improves fuel economy.

SUMMARY

A dual-clutch transmission (DCT) shift sequencing system is provided and includes a shift type module that determines a shift type based on a scheduled gear and a current attained gear of a DCT. A shift sequence module determines a sequence index based on the shift type. A sequencing module generates a fork command signal and a clutch command signal based on a first sequencing table corresponding to the sequence index. A fork control module controls fork shifting in the DCT based on the fork command signal. A clutch control module controls clutch engagement in the DCT based on the clutch command signal.

In other features, a method of operating a DCT shift sequencing system is provided. The method includes determining a shift type based on a scheduled gear and a current attained gear of a DCT. A sequence index is determined based on the shift type. A sequencing table is selected based on the sequence index. Tasks for a first shift process are executed based on the sequence table. Fork command signals and clutch command signals are generated based on the executed tasks. Fork shifting in the DCT is controlled based on the fork command signals. Clutch engagement in the DCT is controlled based on the clutch command signals.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 7 is an exemplary shift type table in accordance with the present disclosure;

FIG. 14 is a first exemplary sequence-to-sequence transition table in accordance with the present disclosure; and FIG. 15 is a second exemplary sequence-to-sequence transition table in accordance with the present disclosure.

DETAILED DESCRIPTION

Figure 1:
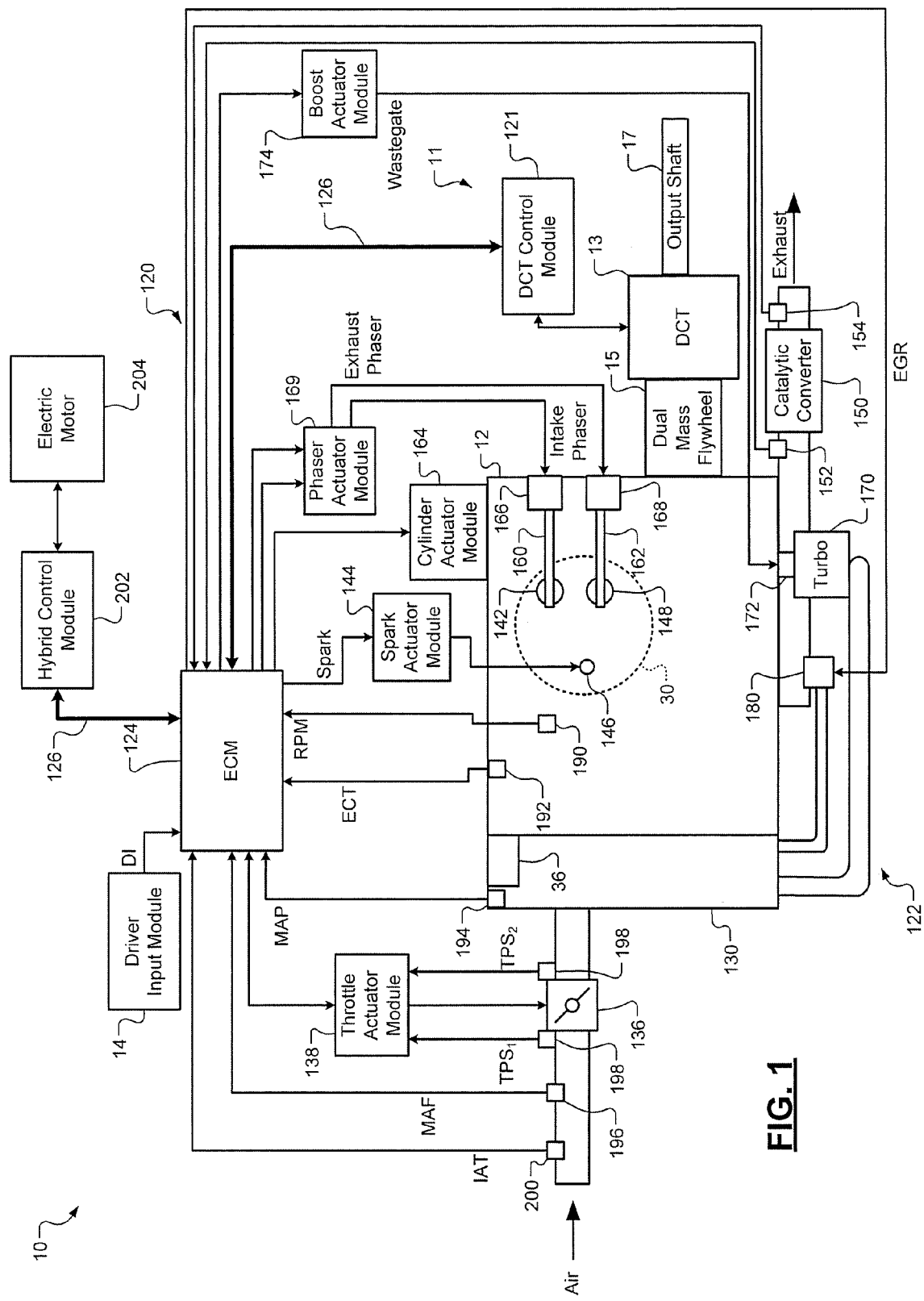
FIG. 1 is a functional block diagram of an exemplary dual clutch transmission (DCT) drivetrain system and corresponding DCT control system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
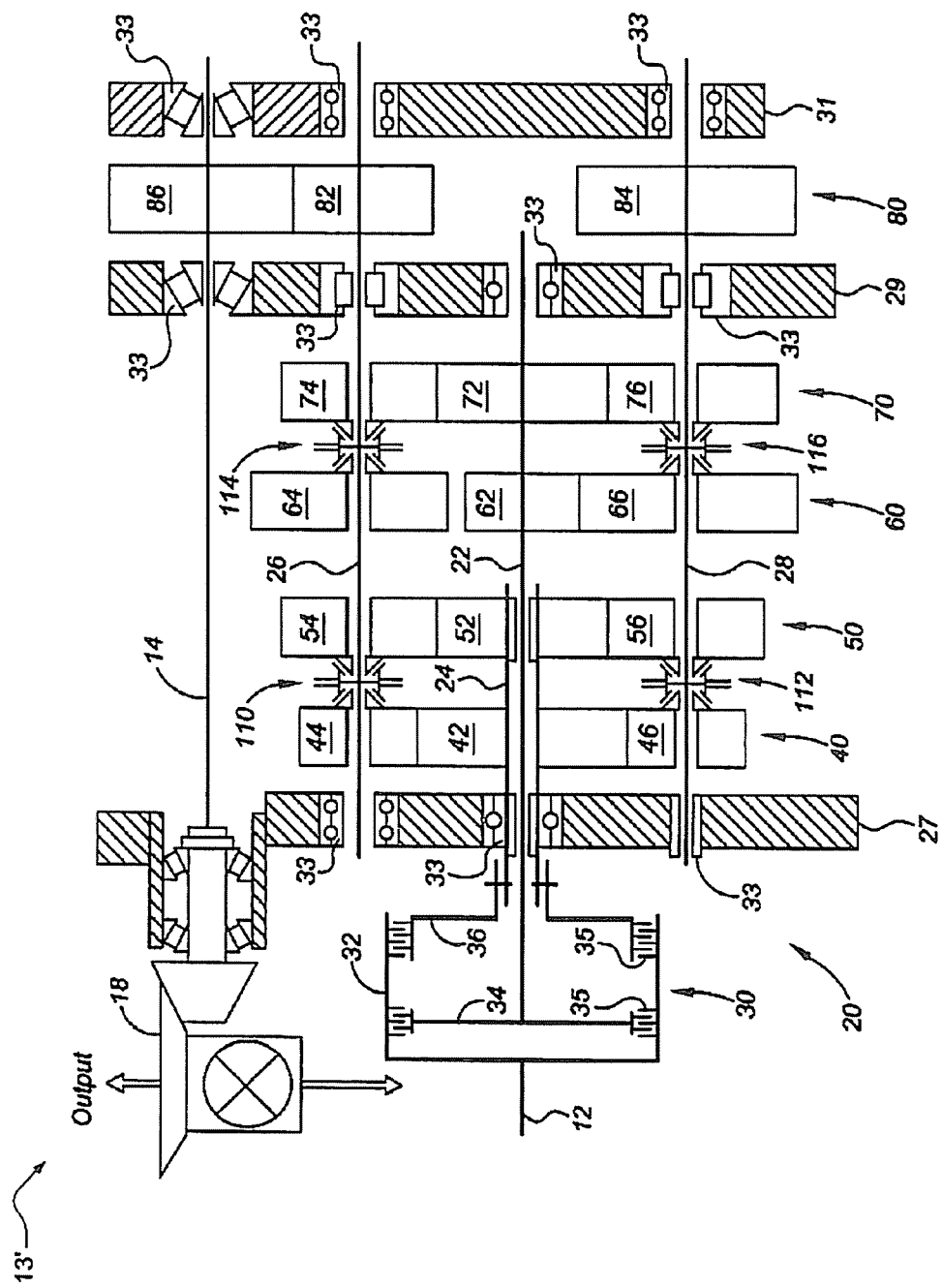
FIG. 2 is a schematic diagram of a DCT.

In FIG. 1, an exemplary dual clutch transmission (DCT) drivetrain (shift sequencing) system 10 and corresponding DCT control system 11 are shown. The DCT drivetrain system 10 includes an internal combustion engine (ICE) 12 and a DCT 13 (example of a DCT is shown in FIG. 2). The ICE 12 combusts an air/fuel mixture to produce drive torque for a vehicle based on information from a driver input module 14 (e.g., driver input signal DI) and other information described below. While a spark ignition type engine is described herein, the present disclosure is applicable to other types of torque producers, such as gasoline type engines, gaseous fuel type engines, diesel type engines, propane type engines, and hybrid type engines. The DCT control system 11 selects transmission gears and performs gear sequencing based on torque output of the engine, the driver input signal DI and other information described below.

The DCT 13 may be a dry or wet DCT. A wet DCT refers to a DCT that includes wet clutches and bathes components in lubricating fluid to reduce friction and heat. A dry DCT does not include a fluid bath, but has decreased drag or spin loss and improved fuel economy over a wet DCT. Wet DCTs are often used for higher torque applications than dry DCTs. The DCT 13 may be directly connected to the ICE 12 or may be connected to the ICE 12 via a torque converter and/or a dual mass flywheel 15, as shown. A dual mass flywheel may be used to: reduce torsional vibration induced by engine firing pulses; eliminate excessive transmission gear rattle; reduce gear change/shift effort; and improve fuel economy.

In FIG. 2, a DCT 13' is shown that have multiple selectable gear ratios. In the example shown, the DCT 13' has 7 forward gear ratios and 1 reverse gear ratio. The DCT 13' includes an input shaft 16 and output shaft 17. The input shaft 16 receives torque from, for example, the ICE 12 and/or the dual mass flywheel 15. The output shaft 17 is connected to a final drive unit 18.

The DCT 13' further includes a countershaft gearing arrangement 20 with a first interconnecting shaft 22 and a second interconnecting shaft 24, which is a sleeve shaft concentric with the first interconnecting shaft 22. The countershaft gearing arrangement 20 further includes a first countershaft (lay shaft) 26 and a second countershaft 28. The countershafts 26, 28 may be spaced apart from and parallel with the input shaft 16, the output shaft 17 and the interconnecting shafts 22, 24.

The output shaft 17, the interconnecting shafts 22, 24 and the countershafts 26, 28 are supported by support members including a first housing member 27, a second housing member 29, and a third housing member 31. The housing members 27, 29, 31 are fitted with bearings 33 for rotatably supporting the output shaft 17, the first and second interconnecting shafts 22, 24, and the countershafts 26, 28.

A dual clutch 30 is connected between input shaft 16 and the first and second interconnecting shafts 22, 24. The dual clutch 30 includes a clutch housing 32 connected for rotation with input shaft 16. Further, the dual clutch 30 has first and second clutch elements or hubs 34 and 36. The clutch elements 34 and 36 and the housing 32 provide a dual friction clutch assembly. The clutch elements 34, 36 and the clutch housing 32 have friction plates 35 mounted thereon that interact to provide two friction clutches.

The clutch element 34 is connected for rotation with the first interconnecting shaft 22. The clutch element 36 is connected for rotation with the second interconnecting shaft 24. Thus, selective engagement of the clutch element 34 with the clutch housing 32 connects the input shaft 12 for rotation with first interconnecting shaft 22. Selective engagement of the clutch element 36 with the clutch housing 32 connects the input shaft 12 for rotation with second interconnecting shaft 24.

The countershaft gearing arrangement 20 also includes co-planar and intermeshing gear sets 40, 50, 60, 70, and 80. The gear set 40 includes gear 42, gear 44, and gear 46. Gear 42 is connected for rotation with the second interconnecting shaft 24 and intermeshes with gear 44 and gear 46. Gear 44 is selectively connectable for rotation with the first countershaft 26. Gear 46 is selectively connectable for rotation with the second countershaft 28.

Co-planar gear set 50 includes gear 52, gear 54, and gear 56. Gear 52 is connected for rotation with the second interconnecting shaft 24 and intermeshes with gear 54 and gear 56. Gear 54 is selectively connectable for rotation with the first countershaft 26. Gear 56 is selectively connectable for rotation with the second countershaft 28.

Co-planar gear set 60 includes gear 62, gear 64, and gear 66. Gear 62 is connected for rotation with the first interconnecting shaft 22 and intermeshes with gear 66. Gear 66 is selectively connectable for rotation with the second countershaft 28. Gear 64 is selectively connectable for rotation with the first countershaft 26 and is also intermeshed with gear 66.

Co-planar gear set 70 includes gear 72, gear 74, and gear 76. Gear 72 is connected for rotation with the first interconnecting shaft 22 and intermeshes with gear 74 and gear 76. Gear 74 is selectively connectable with the first countershaft 26. Gear 76 is selectively connectable with the second countershaft 28. Co-planar or transfer gear set 80 includes gear 82, gear 84, and gear 86. Gear 82 is connected for rotation with the first countershaft 26 and intermeshes with gear 86. Gear 86 is connected for rotation with the output member 14. Gear 84 is selectively connectable for rotation with the second countershaft 28 and is also intermeshed with gear 86.

The DCT 13' further includes synchronizers 110, 112, 114, and 116. Each of the synchronizers 110, 112, 114, and 116 may include a shift fork (not shown) that is bi-directionally translated by an actuator or piston (not shown) into at least two engaged positions and a neutral or disengaged position.

For example, synchronizer 110 is selectively engageable with gear 44 or gear 54. Once engaged, the synchronizer 110 connects gear 44 or gear 54 to the first countershaft 26 for rotation therewith. Synchronizer 112 is selectively engageable with gear 46 or gear 56. Once engaged, the synchronizer 112 connects gear 46 or gear 56 to the second countershaft 28 for rotation therewith. Synchronizer 114 is selectively engageable with gear 64 or gear 74. Once engaged, the synchronizer 114 connects gear 64 or gear 74 to the first countershaft 26 for rotation therewith. Synchronizer 116 is selectively engageable with gear 66 or gear 76. Once engaged, the synchronizer 116 connects gear 66 or gear 76 to the second countershaft 28 for rotation therewith.

The DCT 13' is capable of transmitting torque from the input shaft 16 to the output shaft 17 based on the selected gear ratio. Each forward torque ratio and reverse torque ratio is attained by engagement of the clutches 35 in the dual clutch 30 and one or more of the synchronizers 110, 112, 114, and 116.

As an example, to establish a first forward torque ratio (i.e. a 1st gear), clutch element 36 of the dual clutch 30 is engaged and synchronizer 110 is engaged to connect gear 54 to the first countershaft 26. By this engagement, clutch element 36 of the dual clutch 30 transfers torque from the input shaft 16 through clutch housing 32 to the second interconnecting shaft 24. Further, torque is transferred from the second interconnecting shaft 24 through gear 52 to gear 54. Upon engagement of synchronizer 110, gear 54 transfers torque to the first countershaft 26. The first countershaft 26 transfers the torque to gear 82. Gear 82 transfers the torque to gear 86, which in turn transfers the torque to the output shaft 17. The output shaft 17 transfers the torque to the final drive unit 18. Other gear ratios may be selected by engagement of respective gears and shafts.

Referring again to FIG. 1, the DCT drivetrain system 10 includes the DCT control system 11 and may include an engine control system 120. The DCT control system 11 includes the DCT 13 and a DCT control module 121. The engine control system 120 includes the engine 12, an exhaust system 122 and an engine control module (ECM) 124. The DCT control module 121 and the ECM 124 may communicate with each other via serial and/or parallel connections and/or via a car area network (CAN) 126.

In operation, air is drawn into an intake manifold 130 of the engine 12 through a throttle valve 136. The ECM 124 commands a throttle actuator module 138 to regulate opening of the throttle valve 136 to control the amount of air drawn into the intake manifold 130 based on, for example, information from the driver input module 14. The driver input module 14 may be or receive signals from, for example, an accelerator pedal. Air from the intake manifold 130 is drawn into cylinders of the engine 12 through an intake valve 142. While the engine 12 may include multiple cylinders, for illustration purposes, a single representative cylinder 30 is shown.

The ECM 124 controls the amount of fuel injected into the intake manifold 130 and/or the cylinder 30. The injected fuel mixes with the air and creates the air/fuel mixture in the cylinder 30. A piston (not shown) within the cylinder 30 compresses the air/fuel mixture. Based upon a signal from the ECM 124, a spark actuator module 144 of an ignition system energizes a spark plug 146 in the cylinder 30, which ignites the air/fuel mixture.

The combustion of the air/fuel mixture drives the piston down, thereby driving a rotating crankshaft (not shown). The piston then begins moving up again and expels the byproducts of combustion through an exhaust valve 148. The byproducts of combustion are exhausted from the vehicle via the exhaust system 14.

The exhaust system 14 may include a catalytic converter 150, a pre-converter (primary) $O_2$ sensor 152, and a post-converter (secondary) $O_2$ sensor 154. The sensors 152, 154 communicate with the ECM 124. The catalytic converter 150 is used to control emission output. The intake and exhaust valves 142, 148 may be controlled by a cylinder actuator module 164 via respective camshafts 160, 162 and cam phasers 166, 168. The cam phasers 166, 168 are controlled via a phaser actuator module 169.

The engine control system 120 may include a boost device that provides pressurized air to the intake manifold 130. For example, FIG. 1 depicts a turbocharger 170. The turbocharger 170 provides a compressed air charge to the intake manifold 130. A wastegate 172 may allow exhaust gas to bypass the turbocharger 170, thereby reducing the turbocharger's output (or boost). The ECM 120 controls the turbocharger 170 via a boost actuator module 174. The boost actuator module 174 may modulate the boost of the turbocharger 170 by controlling the position of the wastegate 172. Alternate engine systems may include a supercharger that provides compressed air to the intake manifold 130 and is driven by the crankshaft. The engine control system 120 may further include an exhaust gas recirculation (EGR) valve 180, which selectively redirects exhaust gas back to the intake manifold 130.

The DCT control system 11 and/or the engine control system 120 may measure the speed of the crankshaft (engine speed) in revolutions per minute (RPM) using an RPM sensor 190. Temperature of the engine 12 may be measured using an engine coolant or oil temperature (ECT) sensor 192. The ECT sensor 192 may be located within the engine 12 or at other locations where the coolant and/or oil is circulated, such as a radiator (not shown).

The pressure within the intake manifold 130 may be measured using a manifold absolute pressure (MAP) sensor 194. In various implementations, engine vacuum may be measured, where engine vacuum is the difference between ambient air pressure and the pressure within the intake manifold 130. The mass of air flowing into the intake manifold 130 may be measured using a mass air flow (MAF) sensor 196. The ECM 124 determines cylinder fresh air charge primarily from the MAF sensor 196 and calculates a desired fuel mass using open loop, closed loop and transient fueling algorithms. Fuel injector characterization functions convert the desired fuel mass into an injector on time, which is executed by fuel injector outputs of the ECM 124.

The throttle actuator module 138 may monitor the position of the throttle valve 136 using one or more throttle position sensors (TPS) 198. The ambient temperature of air being drawn into the engine control system may be measured using an intake air temperature (IAT) sensor 200. The ECM 124 may use signals from the sensors disclosed herein to make control decisions for the engine control system.

The ECM 124 may communicate with DCT control module 121 to coordinate shifting gears in the DCT 13. For example, the ECM 124 may reduce torque during a gear shift. The ECM 124 may communicate with a hybrid control module 202 to coordinate operation of the engine 12 and an electric motor 204. In one embodiment, the hybrid control module 202 and the electric motor 204 are not included in the DCT drivetrain system 10. In various implementations, the DCT control module 121, the ECM 124, and the hybrid control module 202 may be integrated into one or more modules.

Figure 3:
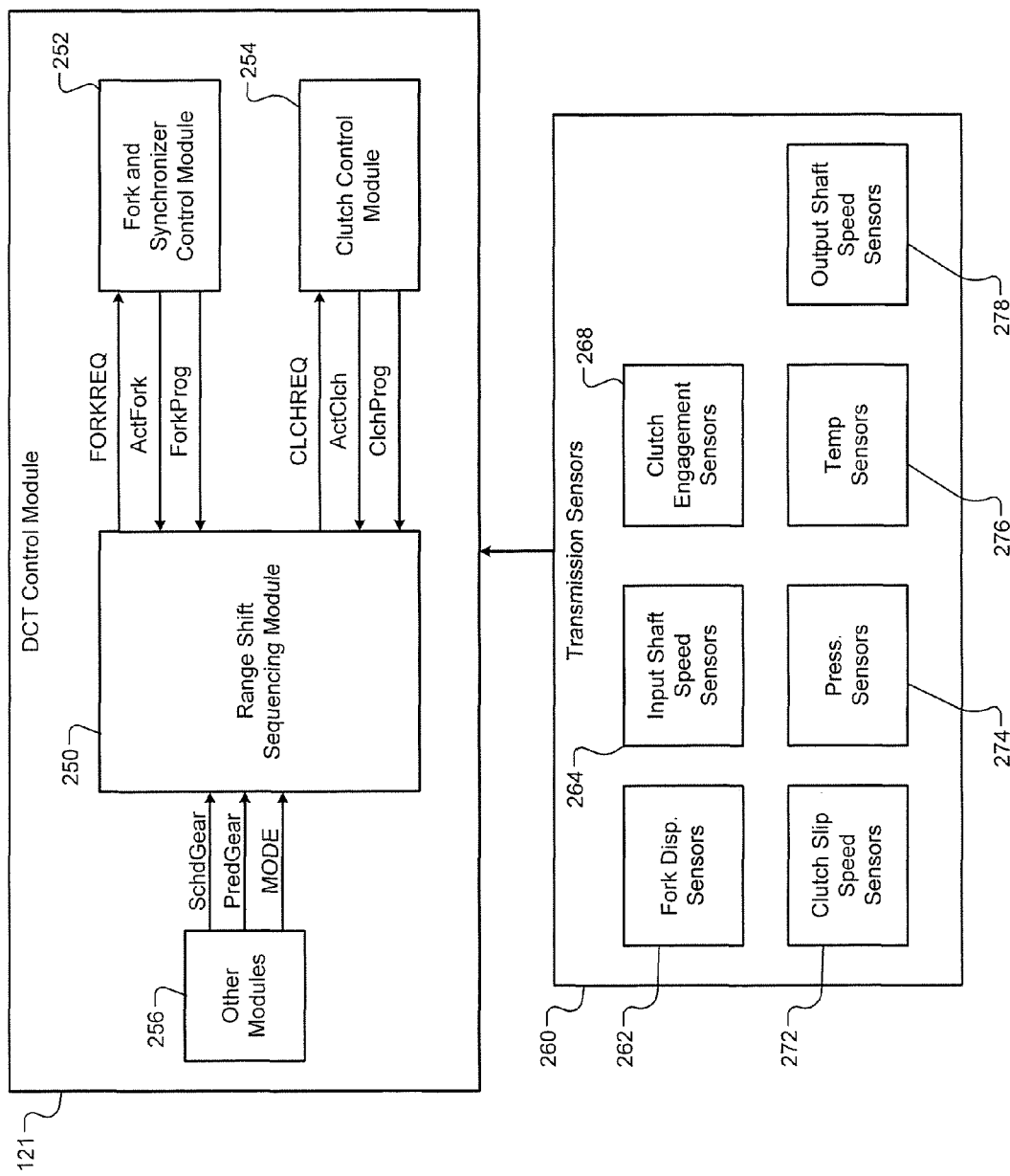
FIG. 3 is a functional block diagram of DCT control module in accordance with the present disclosure.

Referring now also to FIG. 3, a functional block diagram of the DCT control module 121 is shown. The DCT control module 121 includes a range shift sequencing (RSS) module 250, a fork and synchronizer control (FASO) module 252 and a clutch control module 254. The RSS module 250 receives various signals, such as a scheduled gear signal SchdGear, a predicted gear signal PredGear and a mode signal MODE. The various signals may be received from other modules 256 of the DCT control module 121.

The scheduled gear signal SchdGear indicates a commanded gear for the DCT 13. The commanded gear may be different than a current attained gear. A current attained gear refers to a gear(s) with a corresponding clutch that are engaged to provide a certain gear ratio. The other modules 256 may generate the commanded gear signal SchdGear based on a transmission base pattern, an accelerator effective position (i.e. current pedal position), a selected gear range, and a selected shift pattern. The transmission base pattern refers to a selected one of multiple shift patterns, such as a normal base pattern, a default base pattern, a cruise control base pattern, an engine hot base pattern, a tow/haul base pattern, etc. The base pattern may be selected based on driver inputs including a transmission shifter position (i.e. park (P), reverse (R), neutral (N), drive (D), low drive (L)), accelerator position or detent state (full pedal in position), sports input, etc. The base pattern may also be selected based on vehicle conditions, such as altitude, engine temperatures, transmission temperatures, etc.

The predicted gear signal PredGear identifies a predicted gear that is to be commanded based on the driver inputs, engine and transmission states, and vehicle operating conditions. For example, when the accelerator pedal is "tipped in" and the DCT is operating in a $1^{st}$ gear (e.g., gear 54 of FIG. 2), the predicted gear may be the $2^{nd}$ gear (e.g., gear 66 of FIG. 2). The $2^{nd}$ gear may not be commanded until a current speed of the vehicle exceeds a predetermined speed. A synchronizer (e.g., synchronizer 116 of FIG. 2) may be engaged with the $2^{nd}$ gear prior to a corresponding transmission shaft (e.g., countershaft 28 of FIG. 2) engagement via a clutch (e.g., clutch 34 of FIG. 2). This decreases total gear shift time and allows for uninterrupted torque transfer between gears of the DCT 13.

The mode signal MODE identifies a currently selected operating mode. Example operating modes are a normal (base) driving mode, a low speed mode, a sports mode, a default mode, etc. Additional example shift modes are a kick down or shift down mode, an over temperature mode, a limp home mode, and a coast mode. Each mode may have an associated set of shift sequences.

The selected gear range refers to a set of gears assigned for each shifter position (e.g., for positions P, R, N, D, L). For example only, a selected gear range may include a single assigned gear when a shifter is in the reverse position R. A selected gear range may include zero or a single assigned gear when the shifter is in the neutral position N. One or both of the clutches of the DCT 13 may be disengaged when the shifter is in the neutral position N. A selected gear range may include M possible gears when a shifter is in the drive position D or less than M possible gears when the shifter is in the low drive position L. M may be an integer greater than or equal to 4.

The selected shift pattern (i.e. shift map) may be selected based on the selected gear range, the accelerator effective position and the base pattern. A desired gear may be selected based on the shift pattern, the accelerator effective position, and vehicle speed. The commanded or scheduled gear is selected based on the desired gear and the selected gear range. The RSS module 250 generates fork request signals FORKREQ and clutch request signals CLCHREQ based on the commanded gear, the predicted gear, and the operating mode or MODE.

The FASC module 252 controls fork and/or synchronizer engagement within the DCT 13. The FASC module 252 engages or disengages selected synchronizers with selected gears of the DCT 13 based on the fork request signals. The FASC module 252 may generate fork status signals ActFork and fork progress signals ForkProg to indicate position and/or engagement status of the synchronizers in the DCT 13.

The clutch control module 254 controls clutch engagement and disengagement in the DCT 13. The clutch control module 254 engages and disengages clutches within the DCT 13 based on the clutch request signals. The clutch control module 254 may generate clutch status signals ActClch and clutch progress signals ClchProg to indicate engagement status of the clutches in the DCT 13.

The range shift sequencing module performs various tasks as described below based on information from transmission sensors 260. The transmission sensors 260 may include fork displacement sensors 262, input shaft speed sensor 264, clutch engagement sensors 268, output shaft speed sensors 272, pressure sensors 274, temperature sensors 276, shaft speed sensors 278, etc. The displacement sensors 262 may be used to determine fork and/or synchronizer positions of the DCT 13.

The input shaft, clutch engagement and/or output shaft speed sensors 264, 268, 272 and/or an engine crank speed sensor may be used to determine slip speeds and/or states of the clutches of the DCT 13. The pressure and temperature sensors may be used to determine pressures and temperatures within the DCT 13. The shaft speed sensors may determine the speeds of the input, output, interconnecting, counter, and lay shafts of the DCT 13. The information provided by any one of the sensors 260 may be directly obtained from respective one(s) of the sensors 260 and/or indirectly estimated based on signals from other ones of the sensors 260. The information may also be estimated based on signals from other sensors of the DCT drivetrain system 10.

Figure 4:
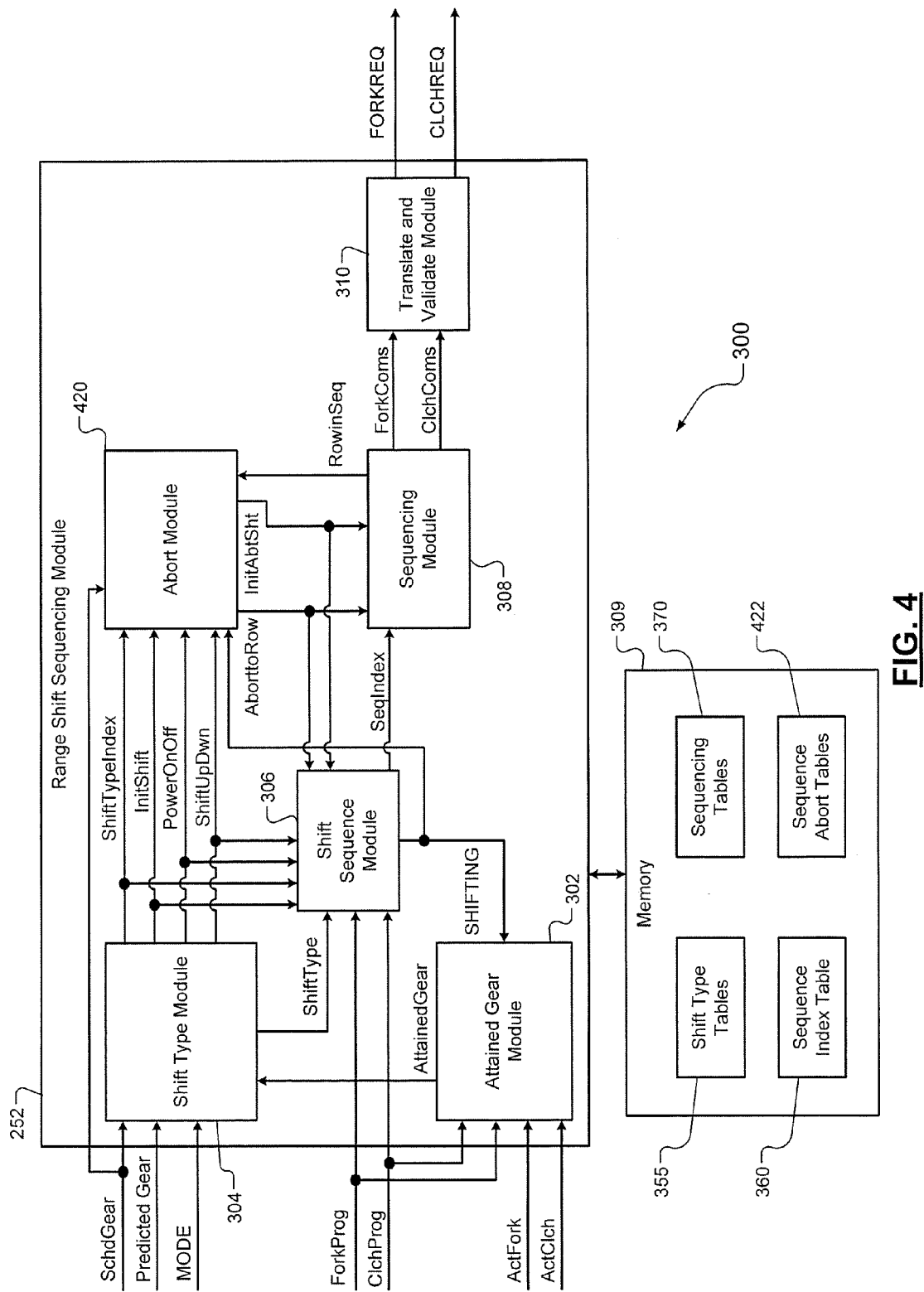
FIG. 4 is a functional block diagram of a range shift sequencing module incorporating a shift sequencing system in accordance with the present disclosure.
Figure 5:
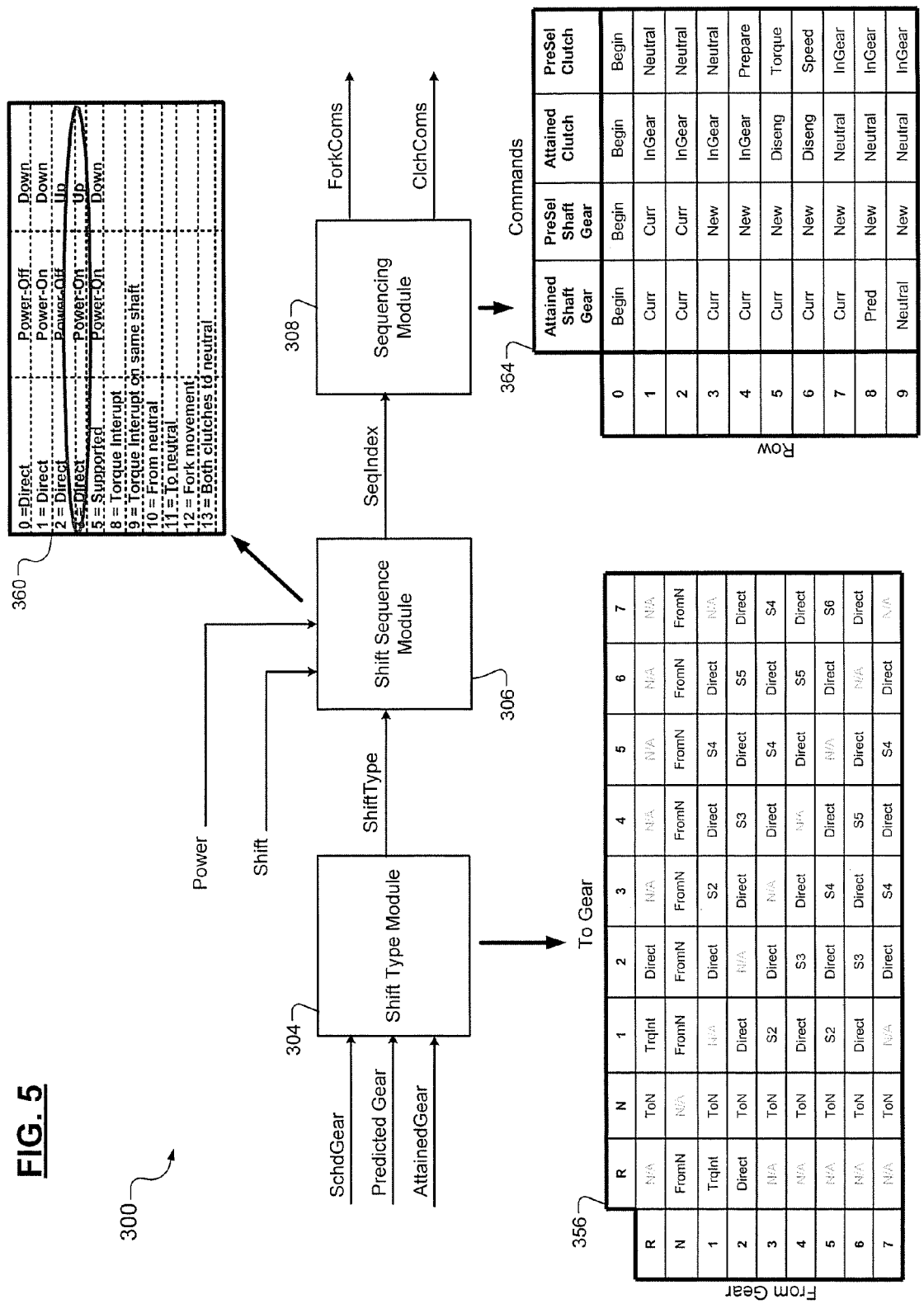
FIG. 5 is a functional block and tabular diagram of a portion of the shift sequencing system of FIG. 4.
Figure 6:
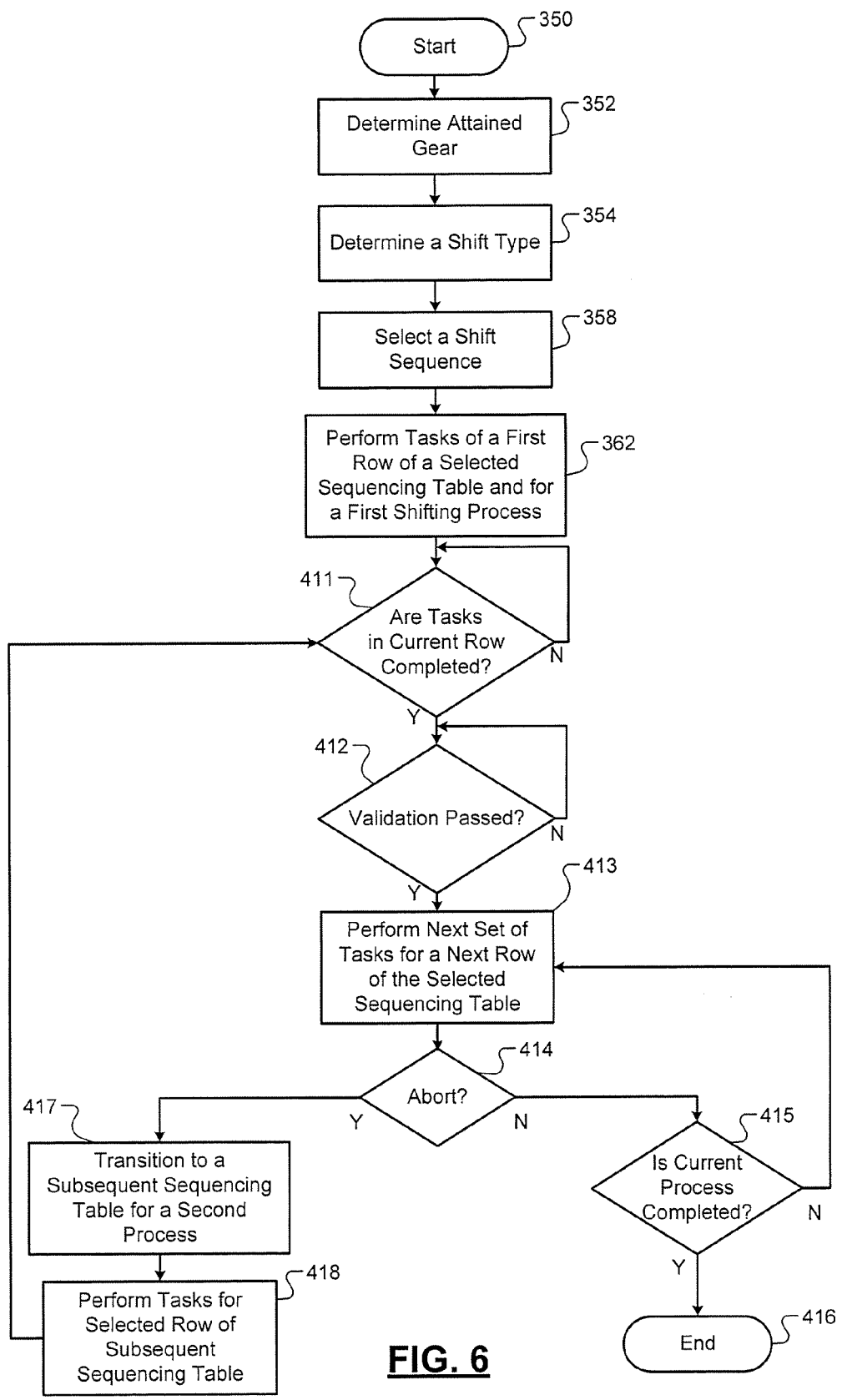
FIG. 6 illustrates a method of operating a DCT control system in accordance with the present disclosure.
Figure 8:
FIG. 8 is an exemplary sequence index table in accordance with the present disclosure.
Figure 9:
FIG. 9 is a first exemplary sequence table for a first sequence in accordance with the present disclosure.

Referring now also to FIGS. 4-6, functional block diagrams of the RSS module 250 and a shift sequencing system 300 and a method of operating a DCT control system (and/or a RSS module) are shown. The shift sequencing system 300 includes an attained gear module 302, a shift type module 304, a shift sequence module 306, a sequencing module 308 and memory 309.

Although the method is described primarily with respect to the embodiments of FIGS. 1-5 and 7-16, the method may be applied to other embodiments of the present disclosure. The tasks of the method may be iteratively performed. The method may begin at 350.

At 352, the attained gear module 302 determines a current attained gear based on the fork and clutch status signals ActFork, ActClch and the fork and clutch progress signals ForkProg, ClchProg. The signals ActFork, ActClch, ForkProg, ClchProg may be generated based on fork, synchronizer, piston, and/or clutch sensors, such as the sensors 260. The signals ActFork, ActClch, ForkProg, ClchProg may be generated based on clutch slip and shaft speeds of the DCT 13 via, for example, sensors 272, 278.

At 354, the shift type module 304 determines a shift type based on the scheduled gear signal SchdGear, the predicted gear signal PredGear and the mode signal MODE. The shift type module 304 selects a shift type table from stored shift type tables 355 stored in the memory 309. A first example shift type table 356 is shown. Another example shift type table 357 is shown in FIG. 7. The shift type table may be selected based on the mode signal MODE.

A shift type is determined from the selected shift type table based on the current attained gear (From gear) and the commanded gear (To gear). For example only, the shift type tables 355 may include: Direct, supported (S1, S2, S3, S4, S5, S6, S7), torque interrupt (TrqInt), torque interrupt of the same shaft (TrqintOS), from neutral (FromN), to neutral (ToN), predicted gear change (Fork), both clutches to neutral (BothCN), and not applicable (N/A) entries. The shift type Direct refers to a direct gear change from, for example, a current attained gear to a commanded gear without an intermediate gear change. For example, a gear shift from a $1^{st}$ gear to a $2^{nd}$ gear may occur without an intermediate gear shift. A non-Direct gear shift from the $1^{st}$ gear to a $3^{rd}$ gear may include intermediate gear shifts from the $1^{st}$ gear to the $2^{nd}$ gear before shifting from the $2^{nd}$ gear to the $3^{rd}$ gear.

The shift type "Supported" refers to performing multiple direct shifts or an intermediate shift to perform the commanded shift requested. For example, since the $1^{st}$ and $3^{rd}$ gears may engage the same countershaft, a shift from the $1^{st}$ gear to the $3^{rd}$ gear includes a torque transition interrupt unless intermediate shifts are performed to support the commanded shift. The intermediate shifts include a shift from the $1^{st}$ gear to the $2^{nd}$ gear and from the $2^{nd}$ gear to the $3^{rd}$ gear. This provides uninterrupted torque transfer between operating gears. Various different supporting shift or intermediate shift combinations may be performed depending on the current attained gear and the commanded gear.

The shift type TrqInt refers to a shift that includes a shift to neutral (e.g., both clutches of the DCT 13 are disengaged for a period of time). This includes an interrupt in torque transfer. This shift type is selected for direct gear shifts between gears that are on different interconnecting shafts and/or countershafts. The shift type TrqIntOS is similar to a TrqInt shift type except the shift is between gears that engage the same countershaft.

The shift types FromN, ToN refer to shifts from and to neutral. The shift type FromN refers to a shift away from neutral to a commanded gear. The shift type ToN refers to a shift from a current attained gear to neutral.

The shift type Fork refers to a synchronizer shift that is performed to engage a predicted gear on a countershaft. The predicted gear is not engaged with an output shaft of the DCT 13 until a command is received to engage the corresponding clutch of the predicted gear. The shift type BothCN refers to a shift to neutral for both clutches of the DCT 13. This shift may include disengaging a current attained gear.

The shift type module 304 generates a shift type signal ShiftType indicating the selected shift type. The shift type module 304 may also generate an initiate shift signal InitShift, a power signal Power and a shift signal Shift. The initiate shift signal InitShift is generated to initiate a gear shift, which may include engaging and/or disengaging one or more gears and/or clutches. The power signal indicates whether the accelerator pedal is in a pedal IN or a pedal OUT state. Pedal IN may refer to the accelerator pedal being rotated or positioned past a predetermined position. Pedal OUT may refer to the accelerator pedal not being depressed or not being rotated past the predetermined position.

The shift signal indicates whether the gear shift to be performed is an up shift or a down shift. An up shift refers to a decrease in gear ratio or an increase in gear number (e.g., $1^{st}$ gear to $2^{nd}$ gear). A down shift refers to an increase in gear ratio or a decrease in gear number (e.g., $4^{th}$ gear to $3^{rd}$ gear).

At 358, the shift sequence module 306 selects a shift sequence index. In one embodiment, the shift sequence index may be, for example, a value between 0-13 and determined using a sequence index table. A portion of an example sequence index table 360 is shown in FIG. 5. The sequence index table 360 is further shown in FIG. 8. For the examples shown, the shift sequence index may be equal to 0 or 13 or any integer value between 0 and 13. The shift sequence index may be determined based on the shift type signal ShiftType, the power signal Power and the shift signal Shift.

At 362, tasks associated the selected sequencing table are performed. The sequencing module 308 generates the fork and clutch command signals ForkComs, ClchComs. The fork and clutch command signals ForkComs, ClchComs are converted into the fork and clutch request signals FORKREQ, CLCHREQ via a translate and validate module 310 shown in FIG. 4. The sequencing module 308 coordinates timing of fork and synchronizer engagements, disengagements and shifts with clutch engagements, disengagements and shifts. This prevents mechanical damage to components of the DCT 13.

Figure 10:
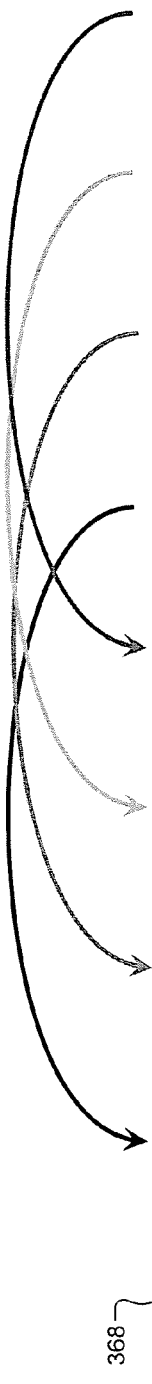
FIG. 10 is a second exemplary sequence table for a second sequence in accordance with the present disclosure.

The fork and clutch command signals ForkComs, ClchComs are generated based a sequence of tasks performed according to the selected sequencing table. A command portion 364 of a first example sequencing table 366 is shown in FIG. 5. The sequencing table 366 is further shown in FIG. 9. The first sequencing table 366 is associated with a shift type of Direct, a power ON signal (e.g., accelerator pedal depressed) and an up shift. Another example sequencing table 368 is shown in FIG. 10. The second sequencing table 368 is associated with a shift type of FromN. The sequencing table may be selected from multiple sequencing tables 370 stored in the memory 309.

Again at 364 and upon accessing the selected sequencing table, the sequencing module 308 executes the tasks associated with the selected sequencing table. The tasks may begin at row 1 (identified as row 0) of the selected sequencing table. Each of the tasks may be associated with a respective row in the selected sequencing table. The tasks may be performed in a sequential order according to row number. For example, when performing the tasks of the sequencing table 366, rows 0-9 are performed in order, as shown. Entries of the table 366 that are labeled Begin, refer to initiate states, tasks or commands. Tasks for each row are associated with each command in that row. This may include a command to remain in a current gear (Curr), a command to shift or engage a selected gear (New), a command to maintain engagement of a clutch with a current attained gear (InGear), a command to shift a clutch to neutral (Neutral), a command to disengage a clutch (Diseng), a command to operate in a preparation phase (Prepare), a command to operate in a torque transition phase (Torque), a command to operate in a speed transition phase (Speed), etc.

Figure 11:
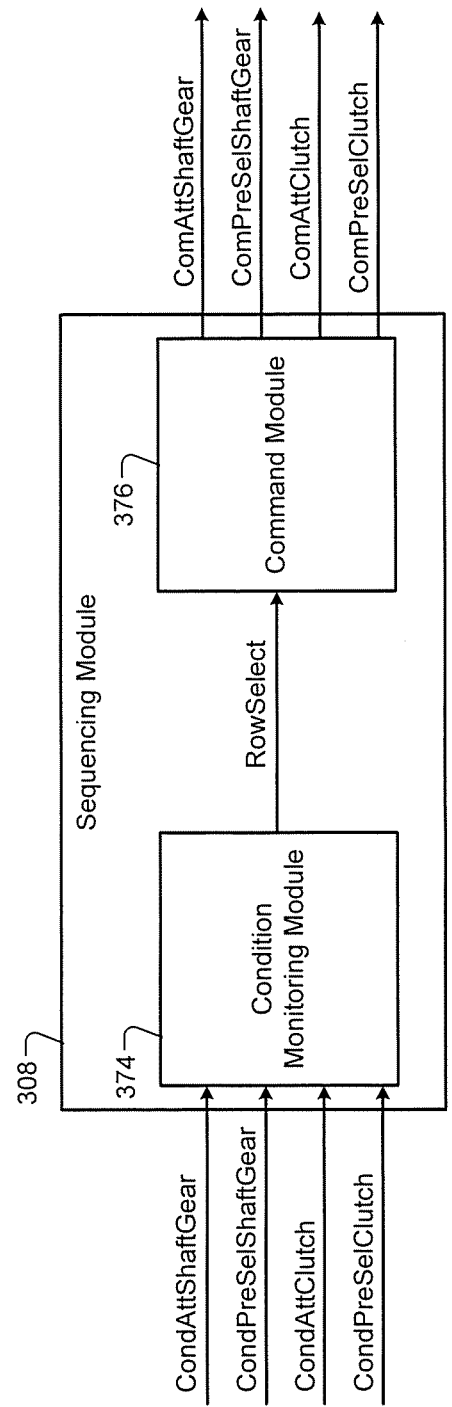
FIG. 11 is a functional block diagram of a sequencing module in accordance with the present disclosure.

Referring now also to FIG. 11, the sequencing module 308 is shown. The sequencing module 308 may include, for example, a condition monitoring module 374 and a command module 376. The condition monitoring module 374 monitors state of the solenoids, pistons, forks, synchronizers, gears and/or clutches of the DCT 13 based on the fork and clutch progress signals ForkProg and ClchProg.

The fork progress signals ForkProg may include an attained gear signal CondAttShaftGear and a preselected gear signal CondPreSelShaftGear, as shown in FIG. 11. A gear may be in one of a currently engaged state, a predicted state, and a neutral state (or disengaged state). The predicted state refers to a predicted state for the gear and may indicate that the gear is transitioning from the current state to the neutral state or from a neutral state to a new current attained state. The attained gear signal CondAttShaftGear indicates the currently attained gear(s) or gears currently engaged to a interconnecting shaft and/or countershaft and have a corresponding clutch that is engaged. The preselected gear signal CondPreSelShaftGear indicates preselected shaft gear(s) that are to be engaged to an interconnecting shaft and/or countershaft shaft. The preselected gears may be predicted and/or commanded gears and do not have a corresponding clutch engaged. Torque is switched from the currently attained gears to the preselected gears.

Figure 12:
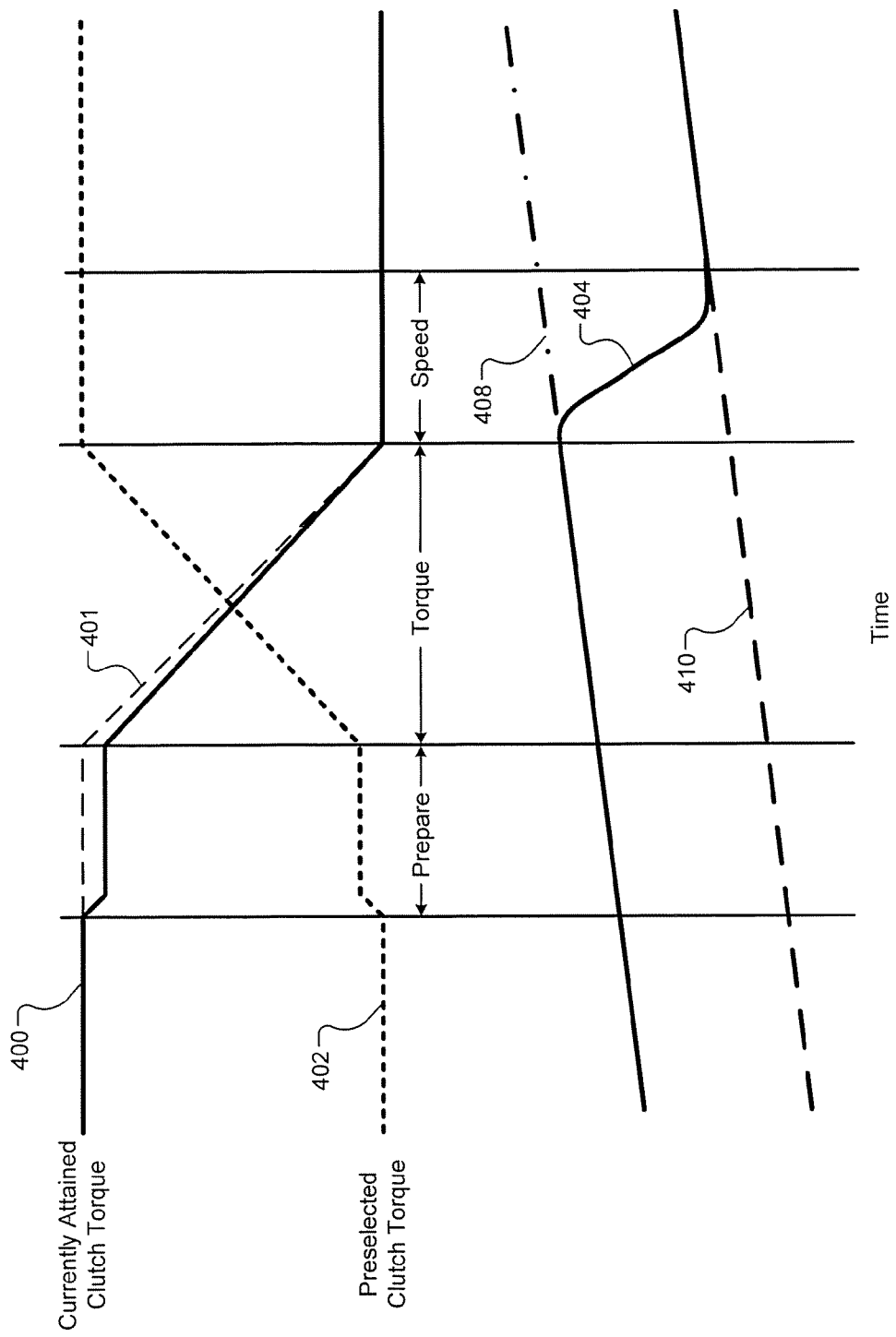
FIG. 12 is a clutch torque and engine speed graph in accordance with the present disclosure.

The clutch condition signals ClchProg may include an attained clutch signal ConfAttClutch and a preselected clutch signal CondPreSelClutch. The attained clutch signal ConfAttClutch indicates state of an attained clutch. The preselected clutch signal CondPreSelClutch indicates state of a preselected clutch (clutch other than the attained clutch). The state of a clutch, for example, may be one of Neutral (or disengaged), Prepare (preparation phase), Torque (torque transition phase), Speed (inertia phase) and InGear (or engaged, i.e. clutch not slipping). Examples of the Prepare, Torque and Speed states are shown in FIG. 12. FIG. 12 includes a torque and an engine speed graph including a currently attained clutch torque plot 400, a preselected clutch torque plot 402, and an engine speed plot 404.

The Prepare state refers to when a clutch is prepared to engage. An actuator of the clutch is switched from a neutral state to a "kisspoint". The kisspoint is a position where a clutch plate just starts to touch a pressure plate without transmitting torque.

The Prepare state may include permitting plates of a currently attained clutch to slip; slip speed is low or less than a first predetermined slip speed. In FIG. 12, for example, the currently attained clutch may not be permitted to slip and have the same torque as prior to the Prepare state or may be permitted to slip and have a decreased amount of torque, as shown by curve 401. Torque of the currently attained clutch during the Prepare state may be based on kisspoint calibration. The Prepare state may also include placing plates of the preselected clutch in contact with each other; slip speed is high or greater than a second predetermined slip speed. As an example, the preselected clutch torque may be less than 0 prior to the Prepare state and may be increased to equal 0 during the Prepare state. The slip in the currently attained clutch and in the preselected clutch results in the torque of the currently attained clutch to decrease and torque of the preselected clutch to increase.

The Torque state refers to when a clutch is in a transition and torque in the clutch is generally increasing from a torque OFF state to a torque ON state. For an up shift, the Speed state occurs here upon completion of the Torque state and includes switching engine speed synchronization. Engine speed synchronization is switched from being synched with a first interconnecting shaft and/or countershaft of the currently attained gear to being synched with a second interconnecting shaft and/or countershaft of the preselected gear. Speed of a first interconnecting shaft is shown by a first dashed line 408. Speed of a second interconnecting shaft is shown by a second dashed line 410. The preselected clutch is slipping at the beginning of the Speed state and is not slipping at the end of the speed state. For a power-on down shift (accelerator pedal tipped in), clutch control includes performing in the Speed state followed by the Torque state.

At 411, the sequencing module 308 proceeds to 412 when the tasks associated with a current row of the selected sequencing table are completed. Completion of the tasks is indicated in the condition columns of the selected sequencing table. State of the gears and clutches associated with each command in the command columns may be continuously updated, indicated and/or checked with preselected or desired condition entries in the condition columns.

At 412, the translate and validate module 310 checks and validates completion of the tasks to assure that all of the tasks for a current row are completed. Checks may be performed to assure that gear shifts are not performed in conflict with a clutch shifts (changes in engaged state of the clutch) and vice versa. In addition, the fork and clutch command signals ForkComs, ClchComs may be checked and validated. This may occur before and/or after performing tasks associated with each row of a sequencing table.

As one example, the fork command signals ForkComs are checked to assure that the fork command signals are directed to selected ones of available gears. For example, available (valid) fork command values may be −1-7, where −1 is reverse, 0 is neutral and 1-7 are available forward drive gears. If a fork command signal has a value other than −1-7 a validation error signal may be generated. As another example, the clutch command signals ClchComs may have possible (valid) states of Neutral, Prepare, Torque, Speed, InGear, Diseng, Begin, etc. If a clutch command signal is not in one of the possible states, a validation error signal may be generated.

Task 413 may be performed when a validation error signal is not generated. The sequencing module 308 may end a current process if a validation error signal is generated more than a predetermined number of times or for more than a predetermined length of time.

At 413, the sequencing module 308 and/or the condition monitoring module 374 may generate a row selection signal RowSelect indicating a next row in the selected sequencing table to perform. The next set of tasks associated with a next row is performed based on the row selection signal RowSelect. At 414, the sequencing module 308 may proceed to 415 when an abort is not commanded, otherwise the sequencing module 308 proceeds to 417. At 415, the sequencing module 308 returns to 413 when a current shifting process is not completed, otherwise the sequencing module 308 may return to 352 or end at 416, as shown.

Figure 13:
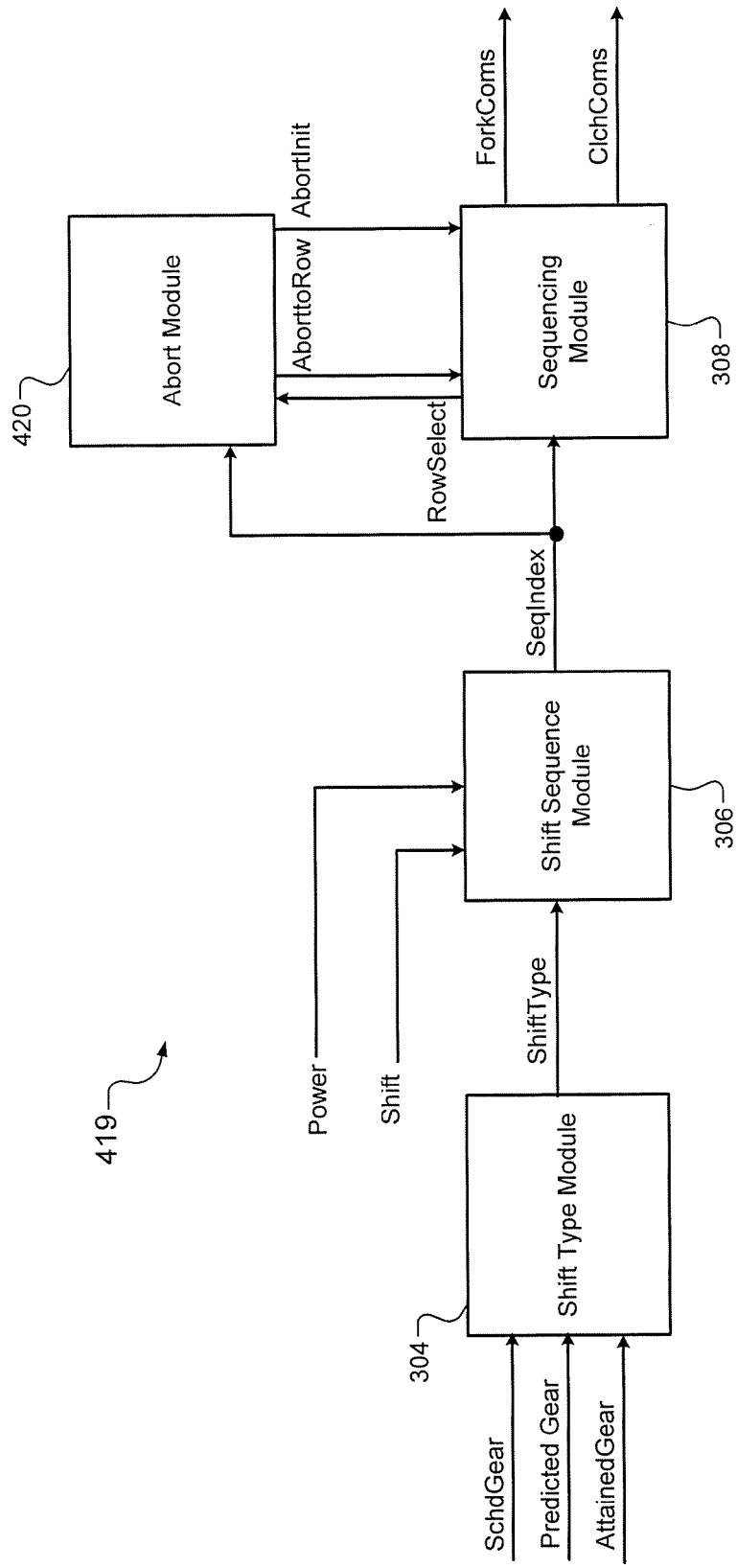
FIG. 13 is a functional block diagram of an abort system in accordance with the present disclosure.

Referring now again to FIG. 4 and also to FIG. 13, the RSS module 250 may also include an abort system 419 with an abort module 420. The abort module 420 interrupts a first shift process associated with a first sequencing table and based on, for example, driver inputs. For example, the abort module 420 may interrupt the sequencing module 308 during an upshift process due to a driver releasing the accelerator pedal and/or applying a brake. In this example, the sequencing module 308 transitions from a first upshift process to a second downshift process based on control signals generated by the abort module 420. As such, at 417, the sequencing module 308 transitions to a subsequent sequencing table for a subsequent (second) shift process. At 418, the sequencing module 308 performs tasks for a selected row in the subsequent sequencing table. The sequencing module 308 may then return to 411.

The abort module 420 may receive the scheduled gear signal SchdGear, the shift type signal ShiftType, the initiate shift signal InitShift, the power signal Power, the shift signal Shift, the sequence index signal SeqIndex and the row selection signal RowSelect based thereon generate an initiate abort signal InitAbtSht and an abort row selection signal AborttoRow. The sequence index signal SeqIndex may identify a current sequence index, which indicates a current sequencing table. The row selection signal RowSelect indicates the current row that is being performed in the current sequencing table.

The initiate abort signal InitAbtSht indicates to abort a current sequencing process. The abort row selection signal AborttoRow indicates a row in a newly selected sequencing table to begin operation after ceasing operation in a current row of the current sequencing table.

Referring now also to FIGS. 13-15, example abort transitions are shown. The abort transitions may be performed based on a sequence abort table selected from sequence abort tables 422 stored in the memory 309. In FIGS. 14 and 15, example sequence abort table 424, 426 and command portions of subsequent (or second) sequencing tables 428, 430 are shown. A sequence abort table relates sequence events (rows) of a first shift sequencing process to sequence events (columns) of a second shift sequencing process. The column event numbers correspond to rows in the second shift sequencing table. Arrows 432, 434 indicate example abort table entries that correspond to rows in the second shift sequencing tables 428, 430. The first exemplary arrow 432 identifies a transition from a third row of a current (first) sequencing table (not shown) to a second row (sequence event 1) of the second sequencing table 428. The second arrow 434 identifies a transition from a second row of a current (first) sequencing table (not shown) to a first row (sequence event 0) of the second sequencing table 430.

The above-described tasks performed in the above-described methods of FIG. 6 are meant to be illustrative examples; the tasks may be performed sequentially, synchronously, simultaneously, continuously, during overlapping time periods or in a different order depending upon the application.

The above-described embodiments provide shift types per DCT demanded power and select the appropriate shift type to satisfy a driver demand. The embodiments include DCT control methods, which are table based. The tables used in the method may be calibrated and include predetermined values, states, ranges, conditions, commands, shift types, etc.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dual-clutch transmission (DCT) shift sequencing system comprising:
   a shift type module that determines a shift type based on a scheduled gear and a current attained gear of a DCT;
   a shift sequence module that determines a sequence index based on the shift type;
   a sequencing module that generates a fork command signal and a clutch command signal based on a first sequencing table corresponding to the sequence index;
   a fork control module that controls fork shifting in the DCT based on the fork command signal; and
   a clutch control module that controls clutch engagement in the DCT based on the clutch command signal.

2. The DCT shift sequencing system of claim 1, wherein the shift type module determines the shift type based on a shift type table relating previously attainable gears to subsequently attainable gears.

3. The DCT shift sequencing system of claim 1, wherein the shift type module determines the shift type based on a shift mode, a scheduled gear and a predicted gear.

4. The DCT shift sequencing system of claim 1, wherein the shift mode is one of a kick down mode, an over temperature mode, a limp home mode and a coast mode.

5. The DCT shift sequencing system of claim 1, wherein the shift type module selects the shift type from a group comprising: a direct shift type; a supported shift type; a from neutral shift type; a neutral shift type; a torque interrupt shift type; a fork shift type; and a clutch to neutral shift type.

6. The DCT shift sequencing system of claim 1, wherein the shift sequence module selects a shift sequence based on accelerator pedal position and a shift direction signal.

7. The DCT shift sequencing system of claim 1, wherein the shift sequence module determines the sequence index based on a sequence index table, the shift type, an accelerator pedal state and a shift direction.

8. The DCT shift sequencing system of claim 1, wherein the sequencing module selects the first sequencing table from a plurality of sequencing tables based on the sequence index.

9. The DCT shift sequencing system of claim 1, wherein the sequencing module comprises:
   a command module that commands a first set of commands; and
   a condition monitoring module that monitors a first set of states and generates a first row selection signal,
   wherein the command module commands a second set of commands when the first set of states satisfy a first set of predetermined conditions.

10. The DCT shift sequencing system of claim 9, wherein:
    the condition monitoring module monitors a second set of states and generates a second row selection signal; and
    the command module command a third set of commands when the second set of states satisfy a second set of predetermined conditions.

11. The DCT shift sequencing system of claim 1, wherein the sequencing module comprises:
    a sequence command module that commands a first set of commands including a first attained shaft gear of a second transmission shaft, a first selected shaft gear of a first transmission shaft, a first clutch state of a first clutch, and a first clutch state of a second clutch; and
    a condition monitoring module that monitors a first set of states including states of the first transmission shaft, the second transmission shaft, the first clutch, and the second clutch and generates a row selection signal,
    wherein the sequence command module commands a second set of commands including a second attained shaft gear of the second transmission shaft, a second selected shaft gear of the first transmission shaft, a second clutch state of the first clutch, and the second clutch state of the second clutch, and
    wherein the sequence command module commands the second set of commands when the row selection signal indicates that the first set of states satisfy a first set of predetermined conditions.

12. The DCT shift sequencing system of claim 1, further comprising an abort module that interrupts a first shift sequencing process and initiates a second shift sequencing process based on a driver input.

13. The DCT shift sequencing system of claim 12, wherein:
    the sequencing module performs the first shift sequencing process based on the first sequencing table and generates a sequence index signal;
    the abort module selects a second sequencing table based on the driver input and the sequence index signal and generates an abort row selection signal; and
    the sequencing module ceases executing the first shift sequencing process and executes the second shift sequencing process based on the second sequencing table and the abort row selection signal.

14. The DCT shift sequencing system of claim 1, further comprising a validation module that validates fork command signals and clutch command signals generated by the sequencing module.

15. The DCT shift sequencing system of claim 14, wherein the validation module:
    prevents performance according to the fork command signals and the clutch command signals when there is a conflict between the fork command signals and the clutch command signals; and
    verifies that the fork command signals and the clutch command signals respectively refer to valid gears and valid clutches.

16. A method of operating a dual-clutch transmission (DCT) shift sequencing system comprising:
    determining a shift type based on a scheduled gear and a current attained gear of a DCT;
    determining a sequence index based on the shift type;
    selecting a sequencing table based on the sequence index;
    executing tasks for a first shift process based on the sequencing table;

generating fork command signals and clutch command signals based on the executed tasks;

controlling fork shifting in the DCT based on the fork command signals; and controlling clutch engagement in the DCT based on the clutch command signals.

17. The method of claim 16, wherein the shift type is selected from a group comprising: a direct shift type; a supported shift type; a from neutral shift type; a neutral shift type; a torque interrupt shift type; a fork shift type; and a clutch to neutral shift type.

18. The method of claim 16, further comprising:

commanding a first set of commands;

monitoring a first set of states and generates a first row selection signal;

commanding a second set of commands when the first set of states satisfy a first set of predetermined conditions;

monitoring a second set of states and generating a second row selection signal; and commanding a third set of commands when the second set of states satisfy a second set of predetermined conditions.

19. The method of claim 16, further comprising:

commanding a first set of commands including a first attained shaft gear of a second transmission shaft, a first selected shaft gear of a first transmission shaft, a first clutch state of a first clutch, and a first clutch state of a second clutch;

monitoring a first set of states including states of the first transmission shaft, the second transmission shaft, the first clutch, and the second clutch and generates a row selection signal; and commanding a second set of commands including a second attained shaft gear of the second transmission shaft, a second selected shaft gear of the first transmission shaft, a second clutch state of the first clutch, and the second clutch state of a second clutch when the row selection signal indicates that the first set of states satisfy a first set of predetermined conditions.

20. The method of claim 16, further comprising:

interrupting a first shift sequencing process and initiating a second shift sequencing process based on a driver input;

performing the first shift sequencing process based on the first sequencing table;

generating a sequence index signal;

selecting a second sequencing table based on the driver input and the sequence index signal;

generating an abort row selection signal;

ceasing execution of the first shift sequencing process; and executing the second shift sequencing process based on the second sequencing table and the abort row selection signal.

* * * * *